May 8, 1962 R. P. WISTNER 3,032,965
ENGINE STARTING APPARATUS
Filed July 11, 1960 3 Sheets-Sheet 1
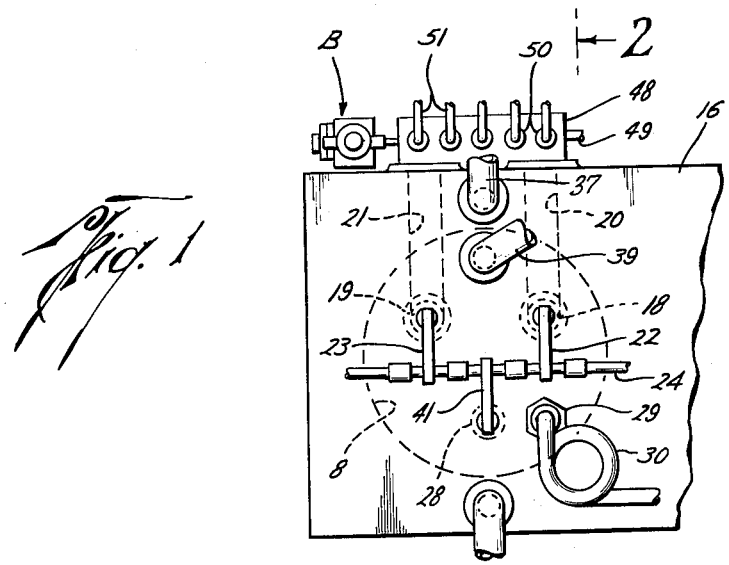
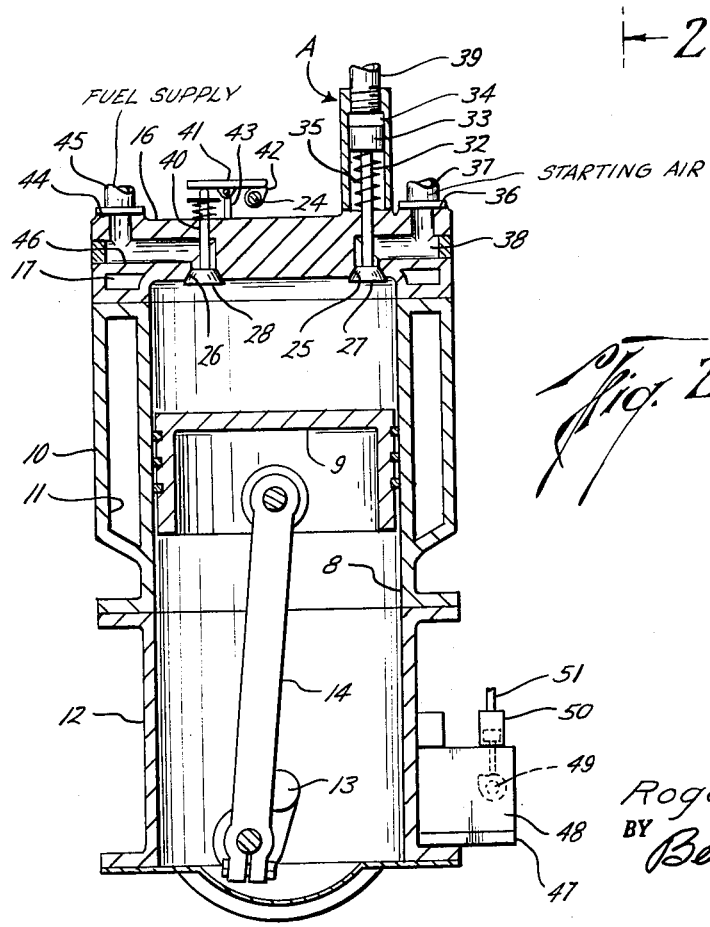
INVENTOR.
Roger P. Wistner
BY Bertram H. Mann
ATTORNEY May 8, 1962 R. P. WISTNER 3,032,965
ENGINE STARTING APPARATUS
Filed July 11, 1960 3 Sheets-Sheet 2
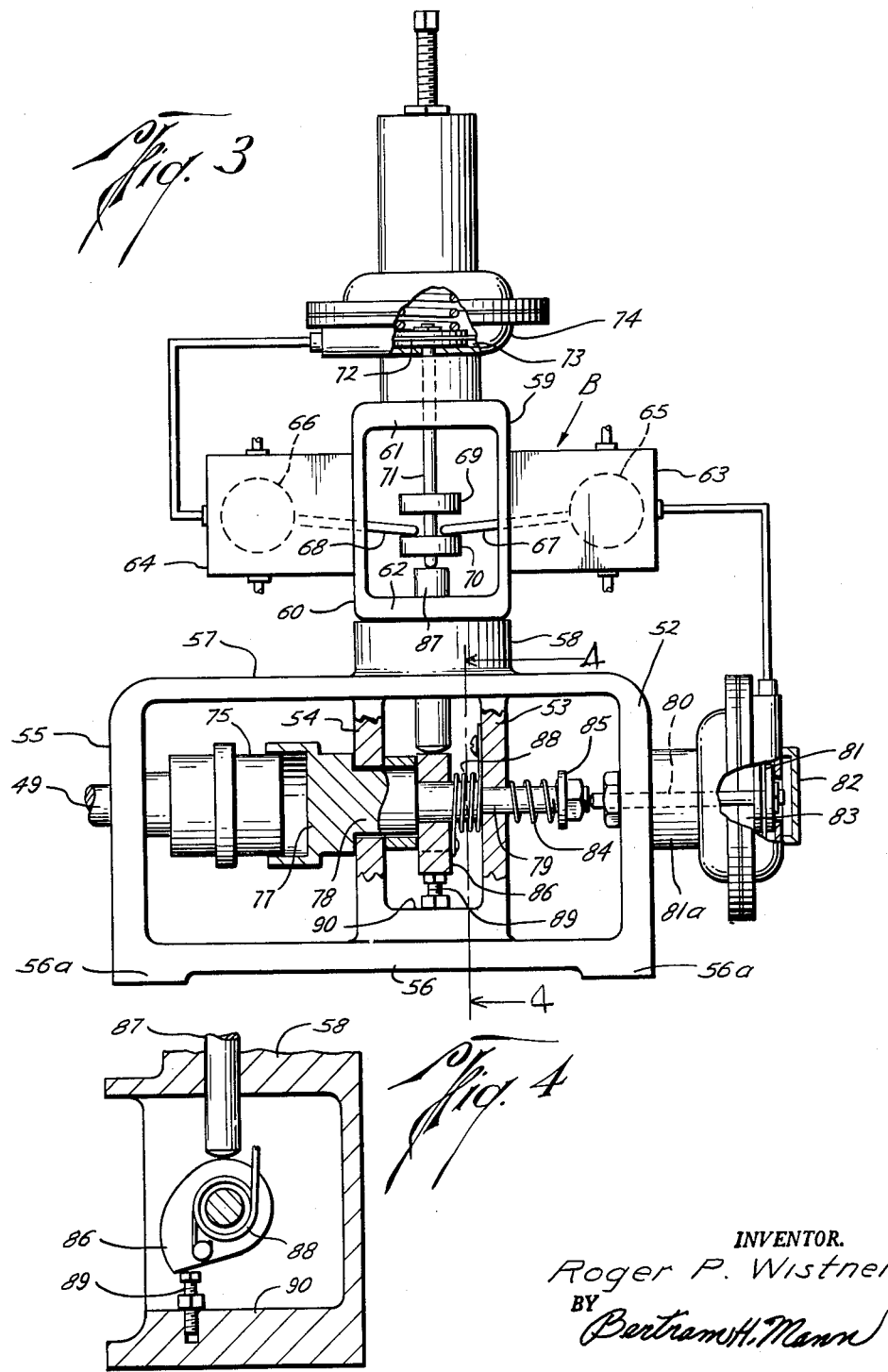
INVENTOR.
Roger P. Wistner
BY Bertram H. Mann
ATTORNEY May 8, 1962 R. P. WISTNER 3,032,965
ENGINE STARTING APPARATUS
Filed July 11, 1960 3 Sheets-Sheet 3

INVENTOR.
Roger P. Wistner
BY Bertram H. Mann
ATTORNEY

United States Patent Office 3,032,965
Patented May 8, 1962

3,032,965
ENGINE STARTING APPARATUS
Roger P. Wistner, 5212 Kelso, Houston, Tex.
Filed July 11, 1960, Ser. No. 42,046
7 Claims. (Cl. 60—16)

This invention relates to starting means for internal combustion engines, particularly of the gas fueled type.

Since it is sometimes impractical or impossible to provide a gas shut-off valve which will insure against leakage when the engine is shut off during substantial periods, there is a danger, with the use of conventional starting systems, in that there may be an accumulation of escaped gas in the firing chambers and exhaust and intake piping will backfire as soon as the ignition is turned on preparatory to starting. The danger is especially serious in the case of very large engines, such as those utilized at booster stations for gas transmission lines. Such engines are operated in accordance with the demand so that there may be substantial periods of shut-down for the engines. There have been instances when explosions caused by turning on of the ignition preparatory to restarting have seriously damaged the engine.

Accordingly, it is an object of the present invention to provide means which will insure complete purging of the engine firing chambers prior to the turning-on of the ignition for igniting the charge.

Another object is to provide engine purging means which delays the turning-on of the ignition during initial cranking for a predetermined number of engine cycles so as to insure adequate purging of the engine.

According to the present invention, the initiation of cranking also actuates a timing device which is in the form of a cam operated at a predetermined relationship to the engine crankshaft. This device, after the proper number of engine revolutions, in turn energizes the ignition system and starts the supply of fuel. It has been found that delaying of the ignition in accordance with engine revolutions is much more satisfactory than timing the delay, for instance, in accordance with engine speed or the passage of a definite interval of time. This is because under favorable conditions of engine lubrication, as when the engine is warm, the engine will turn much more easily than when the lubricant is heavy, as in cold weather, so that the cranking mechanism may cause the engine to reach the predetermined speed for turning on the ignition substantially before thorough purging of gas from the firing chambers. On the other hand, in cold weather, it may be that thorough purging has occurred before the engine reaches the proper speed for turning on the ignition, with the result that starting air is wasted. The same is true with respect to time interval ignition delay in that engine purging does not necessarily occur during a fixed time interval. The wastage of starting air is particularly undesirable at remote pumping stations or where for any reason auxiliary power for supplying the compressed air or operating the starting mechanism is not available or limited.

In the accompanying drawings which illustrate the invention FIG. 1 is a top view illustrating a portion of an engine to which the present invention is applied.

FIG. 2 is a vertical transverse section through one of the cylinders taken substantially on broken line 2—2 of FIG. 1.

FIG. 3 is a side view, partly sectioned and partly schematic, illustrating the novel ignition delay timing means.

FIG. 4 is a detailed section taken substantially on line 4—4 of FIG. 3.

Figure 5:
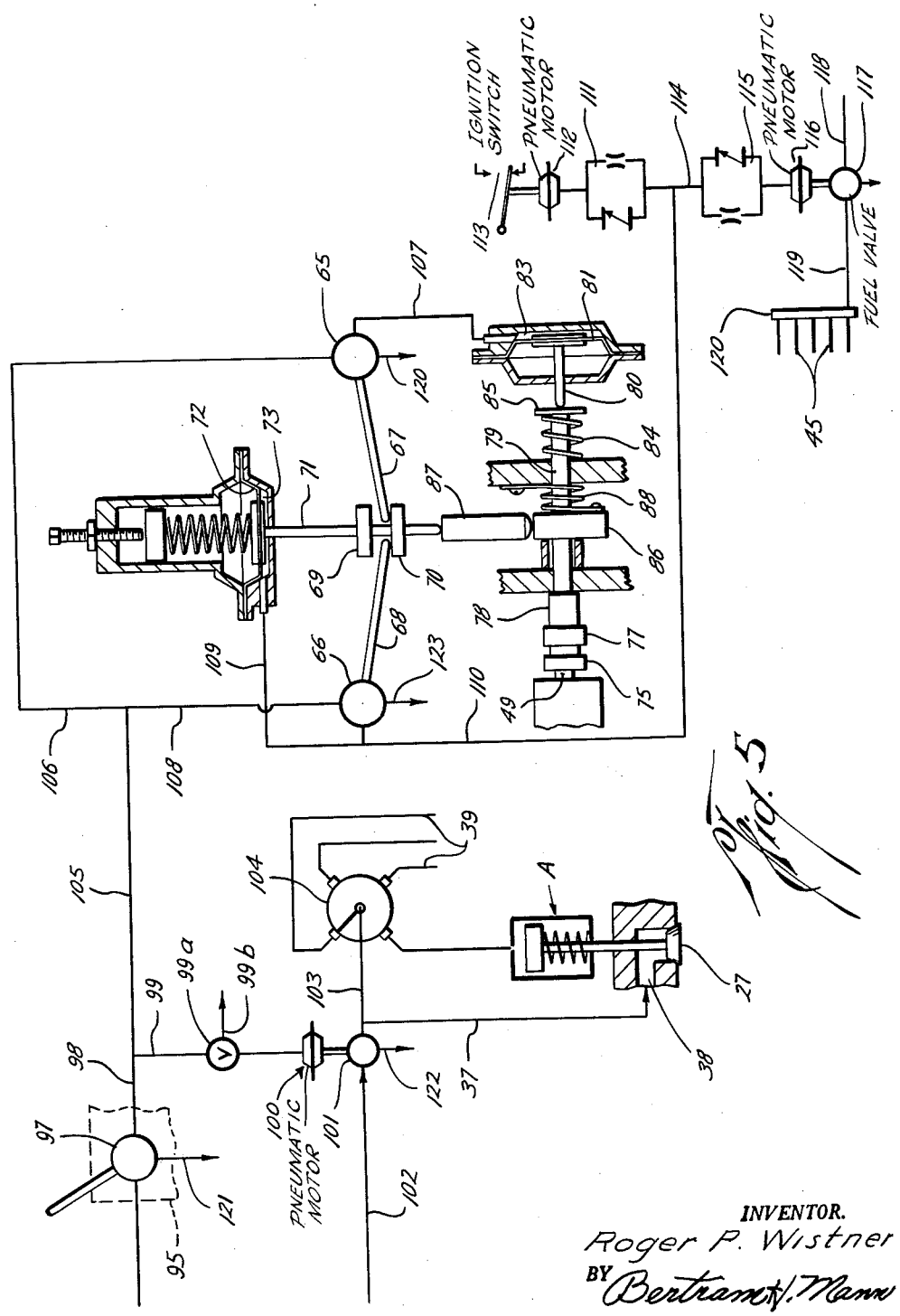
FIG. 5 is a piping and wiring diagram applicable to the invention.

FIG. 1 illustrates a part of a multi-cylinder, four cycle, internal combustion, gas-fueled engine. One of the cylinders is indicated at 8, in which a piston 9 works (FIG. 2). The engine block 10 has the usual cooling pockets 11 and crankcase 12. The pistons are connected to the crankshaft 13 by the usual connecting rods 14 for transmitting developed power to a consuming point. In the case of a gas pipe line booster operating engine, suitable gas pumps are operated from the crankshaft. On the top of the block 11 there is provided a head 16 having cooling pocketing 17.

In the portion of the head immediately above each cylinder there are provided valve seats 18 and 19 for accommodating poppet valves which control the admission to the firing chamber of air and the release of exhaust gases, respectively, through ports 20 and 21 to which are attached intake and exhaust manifold branches (not shown). These poppets, in turn, are operated by rocker arms 22 and 23 on overhead cam shaft 24 which is operated from the engine drive shaft in any suitable way (not shown).

Also provided in the portion of the head above each cylinder are valve ports 25 and 26, respectively, for admitting compressed air for cranking the engine in starting, and gaseous fuel. These ports are controlled by poppet valves 27 and 28, best shown in FIG. 2. Also mounted at a convenient point above each cylinder is a spark plug 29 which is connected to the usual ignition timing system by wiring 30.

Each starting valve 27 is connected by a rod 32 to a servo-motor, generally designated A and including a piston 33 which works in a cylinder 34 mounted above the head. The piston is constantly urged upwardly, so as to normally maintain valve 27 closed, by a coiled spring 35. A pad 36 adjacent cylinder 34 provides for attachment of a pipe 37 (FIG. 5) from the compressed air source to force the piston 9 downwardly when valve 27 is opened. A tube 39 connects with cylinder 34 above piston 33 for supplying control pressure from distributor 104 (FIG. 5) to the cylinder and thereby opening valve 27, as desired.

Fuel valve 28 is connected by a stem or tappet 40 to a rocker arm 41 which is actuated by a cam 42 also on cam shaft 24. All of the rocker arms are suitably supported above the engine head by supports, as indicated at 43. A pad 44 adjacent valve tappet 40 provides for attachment of a gas supply tube 45 (FIG. 5) communicating with a source of gaseous fuel under pressure. Passage 46 in the head leads to valve seat 26. All of the operating structure above each cylinder is normally enclosed beneath a valve cover (not shown).

Mounted on a side of the engine upon a shelf 47 is a lubricator block 48 through which extends oil pump shaft 49 for operating lubricant pumps 50 which supply lubricant to various engine points through tubing 51. Shaft 49 is driven from the engine crankshaft through reduction gearing (not shown). Also mounted on shelf 47 and operated from shaft 49 is the ignition delay timing device, generally indicated at B.

As best shown in FIGS. 3 and 4, the device B consists of a rigid framing or body having a series of verticals 52, 53, 54, and 55. The framing also includes bottom bar 56 with pads 56a for mounting on the lubricator shelf and a top member 57 provided with a central, upstanding boss 58. Bolted to and projecting above boss 58 is a bracket structure consisting of upright side members 59 and 60 connected by top and bottom transverse pieces 61 and 62. Enclosing plates (not shown) will be attached to the framing and bracket members. Projecting oppositely from side pieces 59 and 60 are casings 63 and 64, respectively, accommodating three-way valves 65 and 66 (FIG. 5). Actuator stems 67 and 68 extend inwardly from valves 65 and 66 between a pair of collars 69, 70 rigidly secured to a shaft 71 which reciprocates vertically between bracket members 59 and 60 and is guided by bracket top member 61. At its upper end, shaft 71 is secured to a diaphragm 72 which is exposed on its lower surface to a pressure chamber 73 formed within a casing 74 mounted on top of bracket cross member 61.

The end of lubricator shaft 49 or an extension thereof, which extends into the timer framing, has rigidly secured thereto a fixed clutch member 75. A movable clutch member 77 is received on member 75 and has axial extensions 78 and 79 supported by and slidable through vertical framing members 54 and 53. Extension 79, in turn, abuts a stem 80, slidable in a boss 81a and secured at its distal end to a diaphragm 81 clamped in a casing 82 forming a pressure chamber 83 to which the diaphragm is exposed. A coiled spring 84 compressed between a collar 85 on extension 79 and framing upright 53 constantly urges diaphragm 81 and the extension in the direction to disengage the clutch members. Keyed to intermediate extension 78 between framing uprights 53 and 54 is a cam 86 which is aligned with a reach pin follower 87 slidable in and guided by boss portion 58. Pin 87 is also aligned with shaft 71 upon which collars 69 and 70 are secured and is positioned to push the shaft and collars upwardly, causing actuation of valves 65 and 66, when cam 86 is rotated clockwise from the rest position shown in FIG. 4. A torsion spring 88 between the cam and upright 53 resiliently urges the cam in a counterclockwise direction towards its rest position against an adjustable stop screw 89 threaded into a shelf 90 on the framing structure.

The controls for the engine, preferably, are mounted on a remote panel board, indicated at 95 in FIG. 5, which illustrates schematically only parts of the engine controls related to the present invention. Mounted on the control panel is a manual, three-way starting valve 97 which is connected by piping 98 and 99 to a pneumatic diaphragm motor 100, which actuates three-way valve 101 controlling the supply of pressured starting air or gas from a suitable compressor or other source connected to the valve by piping 102. Valve 101, in turn, is connected by piping 103 to a distributing device 104 from which lines 39 lead to pneumatic motors A controlling the engine starting ports, one of which is shown at 25 in FIG. 2. A valve 99a in line 99 provides for cutting off the signal air supply when the engine starts to run under its own power. Line 37 connects valve 101 to starting port 38.

Manual valve 97 is also connected by piping 98, 105, and 106 to the previously-mentioned three-way valve 65 actuated by collars 69 and 70. Valve 65 is connected by piping 107 to previously-mentioned pneumatic motor 81—83, which actuates movable clutch member 77. Piping 108 connects piping 105 and manual valve 97 to previously-mentioned three-way valve 66 also actuated by collars 69 and 70 and cam 86. Valve 66 is connected by piping 109 to pneumatic motor 72, 73 secured to shaft 71 and by piping 110, past a flow control valve device 111, to pneumatic motor 112 which controls ignition system switch 113. Device 111 is of the type which permits free passage of fluid toward motor 112 when its valve is pressured from line 110 and is off its seat, but restricts the exhausting of fluid from motor 112 when the valve is on its seat. Pneumatic line 110 is also connected by branch piping 114, through flow control valve device 115, to a pneumatic motor 116 which controls fuel supply valve 117. Valve 117 is connected by piping 118 to a suitable source of fuel under pressure, in this case gaseous fuel, and by piping 119 to a fuel distributor or header 120 from which fuel lines 45 extend to the engine head. Any suitable fuel regulating and metering means may be utilized and separate valves for controlling the starting fuel and the main fuel supply during normal running may be provided, if desired. Valve device 115 is of the type which permits rapid exhausting of fluid pressure from motor 116, when the valve is off its seat, while restricting the application of pneumatic pressure to motor 116 when the valve is forced on its seat by the presence of pneumatic pressure in line 114.

The starting system operates as follows: To start the engine, valve 97 is manually actuated to feed a signal air impulse through lines 98, 105, and 106 to valve 65 which, when the engine is not operating, is positioned to pass the impulse through line 107 to pneumatic motor 81, 83 so as to shift extensions 79, 78 leftwardly for engaging clutch members 75 and 77 and rotating cam 86. At the same time, the pneumatic impulse is supplied through line 99 to pneumatic motor 100 which shifts three-way valve 101 to cause the supplying of compressed air or gas through piping 102 and 103 to distributor 104, thence to lines 39 and pneumatic motors A in cranking order. As each line 39 is pressured, one of the pistons 33 is depressed and the corresponding starting valve 27 opened so as to pressure the corresponding cylinder and force its engine piston 9 downwardly. Thus the engine is cranked. After a predetermined number of revolutions of the engine, as determined by the shape and size of cam 86 and the r.p.m. of lubricator shaft 49, reach pin 87, shaft 71, and collars 69 and 70 will be moved upwardly, shifting valves 65 and 66. Valve 65 now is in position to exhaust pneumatic motor 81, 83 through vent 120 which permits compression spring 84 to shift extensions 78, 79 for disengaging clutch members 75 and 77. When this occurs torsion spring 88 returns cam 86 to its normal position against stop 89, as in FIG. 4, and reach pin 87 drops. However, shaft 71 cannot drop at this time, due to the fact that valve 66 is now in position to transmit the signal pressure from line 98, 105, and 108 through line 109 to pneumatic motor 72, 73 which applies an upward bias to shaft 71 so as to hold collars 69 and 70 and their controlled valves 65 and 66 in their assumed positions.

The position of valve 66 corresponding to the lifted position of collars 69 and 70 also directs the signal pressure from lines 98 and 105 through line 110 to fluid motor 112 for closing ignition switch 113 and through branch line 114 to pneumatic motor 116 for opening fuel valve 117. Thereafter, starting of the engine occurs, as customary, as soon as a combustible charge is supplied to the vicinity of the energized spark plugs, one of which is shown at 29 in FIG. 1. Flow control valve device 111 causes prompt response of ignition energizing motor 112 at the end of the number of cranking revolutions previously determined as sufficient for insuring proper purging of the engine firing chambers of gas or other contaminants which may have leaked thereinto. On the other hand, flow control valve device 115 is seated by the signal impulse in lines 110 and 114 so as to delay the actuation of motor 116 and the resultant opening of the fuel valve. Thus control devices 111 and 115 cause establishment of sparking before the flow of gas is started, to prevent fuel wastage, and cutting off of fuel before the ignition is cut off to insure burning of all gas in the cylinders when the engine is stopped, as a safety feature. When the engine starts to run under its own power, valve 99a is shifted in any suitable way, as responsive to oil pressure, to vent motor 100 through 99b, which shifts valve 101 to vent line 103 through 122.

In order to stop the engine, valve 97 may be returned to its initial position which exhausts line 98 through vent opening 121. Venting of line 98 also exhausts pneumatic motor 72, 73 through line 109 and valve 66 which permits the dropping of shaft 71 and collars 69 and 70. Valves 65 and 66, thereupon, are returned to their rest positions in which line 107 is connected through valve 65 to line 106, ready for pressuring of motor 81, 83 and engagement of clutch 75, 77 upon later initiation of the starting cycle by reopening of valve 97. Valve 66, in its rest position, as just described, exhausts line 110 through vent 123 which, in turn, exhausts pneumatic motor 112 for opening ignition switch 113, after a time delay due to the seating of control device 111. At the same time, pneumatic motor 116 is quickly exhausted through open control device 115 for closing fuel valve 117. The system is now ready for the next start which, as previously explained, is initiated by proper actuation of starting valve 97.

The invention may be applied to a starting system utilizing mechanical or other cranking means and also may be applied to two-cycle or four-cycle engines and wherever it is desirable to delay the energization of the ignition and/or fuel system during a predetermined initial cranking period for purging or other purpose. Moreover, the various controls for the starting functions may be electrical, utilizing solenoids and switches in place of the pneumatic motors and valves. The invention may be modified in various respects as will occur to those skilled in the art and the exclusive use of all modifications as come within the scope of the appended claims is contemplated.

I claim:

1. In combination with an internal combustion engine, engine cranking means, means to supply a combustible charge to the engine, means to ignite said charge, means to initiate operation of said cranking means, timing means sensitive to engine cycles and adapted to energize said ignition means, and means to operatively connect said timing means to the engine for causing energization of said ignition means after a predetermined number of cranking revolutions of the engine.

2. In combination with an internal combustion engine having firing chambers and intake and exhaust piping connected thereto, engine cranking means, means to initiate cranking of the engine thereby, means to supply fuel to said firing chambers including a fuel control valve, fuel ignition means associated with said chambers, means responsive to operation of said cranking means for opening said control valve and energizing said ignition means, and means directly connected to the engine to delay actuation of said last-mentioned means a predetermined number of engine revolutions after initiation of cranking to provide for purging of the engine firing chambers and connected piping before energization of said ignition means for starting of the engine.

3. Internal combustion engine starting means comprising a source of pneumatic pressure, means to direct said pneumatic pressure to the engine for cranking the same, a starting valve controlling said directing means, means to supply a gaseous fuel charge to the engine including a fuel control valve, means to ignite the fuel charge including an ignition switch, means to open said starting valve to initiate cranking of the engine, and means operatively connected to the engine for automatically opening said fuel control valve and closing said ignition switch following a predetermined number of revolutions of the engine to provide for purging of the engine before starting of the engine.

4. In combustion with an internal combustion engine having cranking, fueling, air supply and exhausting, and ignition means and control devices therefor, starting means comprising a source of auxiliary power, a cam mounted for rotation, a cam follower for said cam, clutch means for coupling said cam to the engine for rotation therewith, a first motor connected to said source for causing engagement of said clutch means, a manual control for said first motor and said cranking means control device, second and third motors, operative connections between said second and third motors and said fueling and ignition control devices, controls for said last-mentioned motors, and operative connections between said cam follower and said controls whereby said fueling and ignition control devices are actuated through said cam after a predetermined number of cranking revolutions of the engine to provide for purging of the engine including said air supply and exhausting means before starting.

5. Starting means as described in claim 4 in which at least one of said controls includes delay means for causing serial actuation of said last mentioned motors.

6. The combustion with an internal combustion engine having cranking, fueling, air intake and exhausting, and ignition means and control devices therefor, of starting means comprising a source of fluid pressure, a cam mounted for rotation, a cam follower for said cam, clutch means for coupling said cam to the engine for rotation therewith, a first fluid motor connected to said source for causing engagement of said clutch means, a manual control for said first fluid motor and said cranking means control device, second and third fluid motors operatively connected to said fueling and ignition control devices, ducts connecting said second and third fluid motors to said source, valves controlling said ducts, and an operative connection between said cam follower and one of said valves whereby said fueling and ignition control devices are actuated through said cam after a predetermined number of cranking revolutions of the engine with consequent operation of said air intake and exhausting means to insure purging of the engine including said intake and exhausting means before starting.

7. In combination with an internal combustion engine, engine cranking means, means to suupply a combustible charge to the engine, control means for said charge supply means, means for operatively connecting said control means to the engine including a timing device capable of sensing predetermined cycles of engine operation, and means to initiate actuation of said cranking means and to operatively couple said timing device to the engine for actuating said charge control to cause the supply of fuel to the engine after a predetermined number of cranking cycles to provide for purging of the engine.

References Cited in the file of this patent

UNITED STATES PATENTS

| | | |
|---|---|---|
| 2,077,185 | Renner | Apr. 13, 1937 |
| 2,714,883 | Metzger | Aug. 9, 1955 |